(12) United States Patent
Maroney et al.

(10) Patent No.: US 6,775,450 B2
(45) Date of Patent: Aug. 10, 2004

(54) MICRO-STRUCTURED OPTICAL FIBERS

(75) Inventors: Andrew V Maroney, Epping (GB); Andrew L Reynolds, Bearsdon (GB); Kevin J Cordina, Bishops Stortford (GB); Kostas Tastavridis, Bristol (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/011,079

(22) Filed: Dec. 7, 2001

(65) Prior Publication Data

US 2003/0108316 A1 Jun. 12, 2003

(51) Int. Cl.⁷ .......................... G02B 6/02; C03B 37/028; C03B 37/10
(52) U.S. Cl. .......................... 385/126; 385/123; 65/411; 65/428
(58) Field of Search .............................. 385/126; 65/411

(56) References Cited

U.S. PATENT DOCUMENTS

| | | | | |
|---|---|---|---|---|
| 5,011,251 A | * | 4/1991 | Miller et al. | 385/43 |
| 5,048,923 A | * | 9/1991 | Tsumanuma et al. | 385/117 |
| 5,076,825 A | * | 12/1991 | Hayami et al. | 65/411 |
| 5,078,767 A | * | 1/1992 | Berkey | 65/411 |
| 5,944,867 A | * | 8/1999 | Chesnoy et al. | 65/408 |
| 6,301,420 B1 | * | 10/2001 | Greenaway et al. | 385/126 |
| 6,490,389 B1 | | 12/2002 | Goodwin | |
| 6,526,192 B2 | | 2/2003 | Maroney | |
| 6,628,871 B2 | | 9/2003 | Maroney | |
| 6,640,043 B2 | | 10/2003 | Handerek | |
| 2003/0056550 A1 | * | 3/2003 | Tanaka et al. | 65/428 |

OTHER PUBLICATIONS

Kashyap, "Observation of Catastrophic Self–Propelled Self––Focusing in Optical Fibres," Electronics Letters, vol. 24, No. 1, Jan. 7, 1988, pp. 47–49.
Hand, "Single–Mode Tapers as 'Fibre Fuse' Damage Circuit–Breakers," Electronics Letters, vol. 25, No. 1, Jan. 5, 1989, pp. 33–34.

* cited by examiner

*Primary Examiner*—John D. Lee
*Assistant Examiner*—Tina Lin
(74) *Attorney, Agent, or Firm*—Barnes & Thornburg

(57) ABSTRACT

A micro-structured optical fiber precursor 1 is made by size reducing a multiple core optical fiber having solid multiple cores or a multiple core optical fiber preform O having multiple solid core preforms C. A fiber fuse is induced in at least one of the cores 2 of the precursor 1. The effect of the fiber fuse is to consume the core 2 along the whole length of the fiber or to consume periodically spaced lengths of core 2 along the whole length of the fiber.

10 Claims, 3 Drawing Sheets

MICRO-STRUCTURED OPTICAL FIBERS

FIELD OF THE INVENTION

The invention relates to a class of micro-structured optical fibres known as photonic crystal fibres (PCFs), holey fibres (HFs) and generic micro-structured optical fibres and to methods of making them. Optical fibres are used, for example, in optical communications networks to carry optical communication signals.

BACKGROUND TO THE INVENTION

Conventional step-index optical fibres typically comprise a central core of relatively high refractive index material, surrounded by a cladding of relatively low refractive index material, encased in a protective jacket. Light is confined to the core by total internal reflection as a result of the step difference in refractive index between the core and the cladding.

In contrast to conventional step-index fibres, PCFs and HFs typically comprise one material that is provided with periodic features in the cross section of the fibre, transverse to the propagation direction. These features are generally air holes which run along the length of the fibre. The periodic features define a lattice, and the fibre is characterised by the lattice pitch and the shape, typically the hole diameter, of the periodic features.

In the case of solid core PCFs, a central defect is created by removing or altering hole(s) along the length of the fibre at the centre. The effective refractive index of the surrounding material is reduced as a result of the presence of the periodic features. Removing a hole completely from the centre creates a central defect whose effective refractive index is larger than the surrounding fibre material. Therefore, in a manner analogous to a step-index fibre, light is confined to the central defect by total internal reflection due to the step change in refractive index contrast between the central defect and the surrounding material. Hence, to continue the analogy, the central defect effectively acts as the core region and the surrounding material as the cladding region. Such PCFs are often known as holey fibres.

Illustrated in FIG. 1 is a typical holey fibre comprising fibre material 20, periodically arranged air channels 22, a central solid core region 24 and a cladding region 26.

Periodic features within the cross section of the fibre can produce band gap effects controlling the light frequencies that are permitted to propagate within the same cross sectional plane of the fibre. Within the band gap no allowed modes exist. In general, the lattice pitch, the periodic feature's size and shape, and the contrast between the periodic feature and the embedding host material refractive index determine whether a photonic band gap, (PBG) exists. More than two materials can be used to create a PBG material. In the case of hollow core PCFs, the central defect may be created by an oversized hole. The defect can create an allowed state in the band gap that allows light to propagate along the central defect of the fibre, but which is also simultaneously confined to the core by the surrounding PBG material. The defect is often, but not necessarily, an air hole. This is the reverse of a step-index fibre where the light is confined to a medium that is more optically dense.

At present, PCFs are generally made by the sequential size reduction of micro structured optical fibre preform frequently containing suitably, often geometrically, arranged cylindrical air channels running the length of the fibre. Sequential size reduction is usually achieved by pulling an end of the preform that has been heated until plastic in a furnace. The preforms may be made by either systematically stacking together a bundle of suitable capillary tubes, with or without a solid central rod to form a solid core as appropriate, or by drilling a block of fibre material.

However, the difficulties associated with making PCFs by such methods, notably in terms of maintaining cleanliness and uniformity and the associated resolution issues, means that there is a limit on the length of PCFs that can be produced. Uniformity is a particular problem, and unless the size reduction process is very carefully controlled, hole collapse may occur, leading to distortion. At present, although solid core PCFs may be produced in lengths of several kilometers; hollow core PCFs may be produced in lengths of several meters at most.

So-called "fibre fusing" is a phenomenon, akin to the behavior of overloaded electrical metal fuse wire, where the material of the optical fibre melts and the melting propagates, thereby consuming fibre as it proceeds. It is known that fibre fusing can be initiated by shocking an end of the fibre say with heat or impact.

Multiple core optical fibres are generally fabricated by fusing together multiple, parallel strands of core material and a cladding material so as to embed the cores in the cladding, thereby providing a multiple core fibre preform. The preform is then size reduced down to the required dimensions by heating it until plastic and pulling one end.

Current PCFs are limited to two dimensional lattice structures because no known method has been proposed to make the periodic features anything other than continuous along the whole length of the fibre material. At present, use of PCFs is limited to optical gain, harmonic generation, continuous generation and enhanced fibre lasers. It is not possible to write a Bragg grating into an air core and the introduction of an active material in the air core region destroys the photonic band gap confinement.

OBJECT OF THE INVENTION

An object of the invention is to provide a method of making micro-structured optical fibres, including, but not limited to, PCFs, and HFs in long lengths.

BRIEF DESCRIPTION OF THE INVENTION

According to a first aspect, the invention provides a method of making a micro-structured optical fibre precursor comprising the step of size reducing a multiple core optical fibre having solid multiple cores.

Typically, a multiple core optical fibre will have forty cores, although other numbers of cores are equally feasible.

According to a second aspect the invention provides a method of making a micro-structured optical fibre precursor comprising the step of size reducing a multiple core optical fibre preform having solid multiple core preforms.

Having solid cores or core preforms overcomes many of the difficulties previously associated with the size reduction process in micro-structured optical fibre fabrication. For example, the absence of air channels during the process means that the problems of channel collapse and fibre fragility are negated, and core size can be controlled with relative ease. Overall, uniformity can be attained over much longer lengths of fibre. However, if the fibre is ultimately to have air channel periodic features, a method is required of removing the solid cores.

According to a third aspect the invention provides a method of making a micro-structured optical fibre comprising the step of inducing a fibre fuse in at least one of the cores of a multiple core optical fibre precursor having multiple solid cores. The term fibre fuse as used in this context means not only fibre fuse in the sense described in the background but to any effect that results in the partial or total consumption of the solid cores.

The dimensions of the optical fibre will be determined according to its intended application and wavelength of operation.

The effect of the fibre fuse may be to consume the core along the whole length of the fibre thereby creating a continuous channel in the fibre material. Hence, the periodic lattice resulting from the creation of a periodic arrangement of channels will have two-dimensional characteristics. Alternatively, the effect of the fibre fuse may be to consume periodically spaced lengths of core along the whole length of the fibre thereby to create periodically discontinuous channels. Discontinuous channels can lead to the creation of a lattice with three-dimensional characteristics in the fibre material.

A fibre fuse may or may not be induced in the central core or cores according to whether a solid or hollow core microstructured optical fibre is required.

The core and cladding materials may, or may not, be the same or substantially the same. Typically, silica is used for multiple core optical fibres, but other materials could be used, including various dopants in silica, such as erbium. Other materials include but are not limited to chalcogenides and tellurite. The primary requirement is that the materials need to be able to melt simultaneously without the creation of thermal stresses.

Shocking the core by heating or impacting the core, or by any other treatment that has the same effect, may induce the fibre fuse. The fibre fuse is preferably induced while the core is carrying a signal. For example, light of sufficient power and appropriate wavelength, produced by for instance a semiconductor laser device, may be coupled into one end of the fibre which may then be heated at the other end.

According to a fourth aspect, the invention provides a method of making a micro-structured optical fibre comprising the steps of size reducing a multiple core optical fibre having solid multiple cores or size reducing a multiple core optical fibre preform having solid multiple core preforms, thereby to provide a size-reduced multiple core optical fibre, and inducing a fibre fuse in at least one of the cores of the size-reduced optical fibre.

According to a fifth aspect, the invention provides a micro-structured optical fibre made by a method according to a first, second, third or fourth aspects of the invention.

According to a sixth aspect, the invention provides an optical communications network comprising a micro-structured optical fibre made by a method according to a first, second, third or fourth aspects of the invention.

In a single mode optical fibre, fusing occurs where the mode intensity is highest, that is, at the centre of the core. In a multi-mode fibre, by launching a supported higher mode into the fibre, symmetric and periodic patterns of voids can be created in the cross-section of the fibre, as higher order mode patterns are themselves symmetric. The size and position of the voids can be adjusted through careful choice of the higher order mode. Thus, an alternative method of making a micro-structured optical fibre is to take a multi-mode fibre and to launch a higher order mode into the core or cores.

According to a seventh aspect, the invention provides a method of making a micro-structured optical fibre comprising the steps of providing a multi-mode optical fibre having at least one core and launching into the fibre a supported higher order mode thereby to induce fibre fusing in the at least one core.

DESCRIPTION OF THE INVENTION

Figure 1:
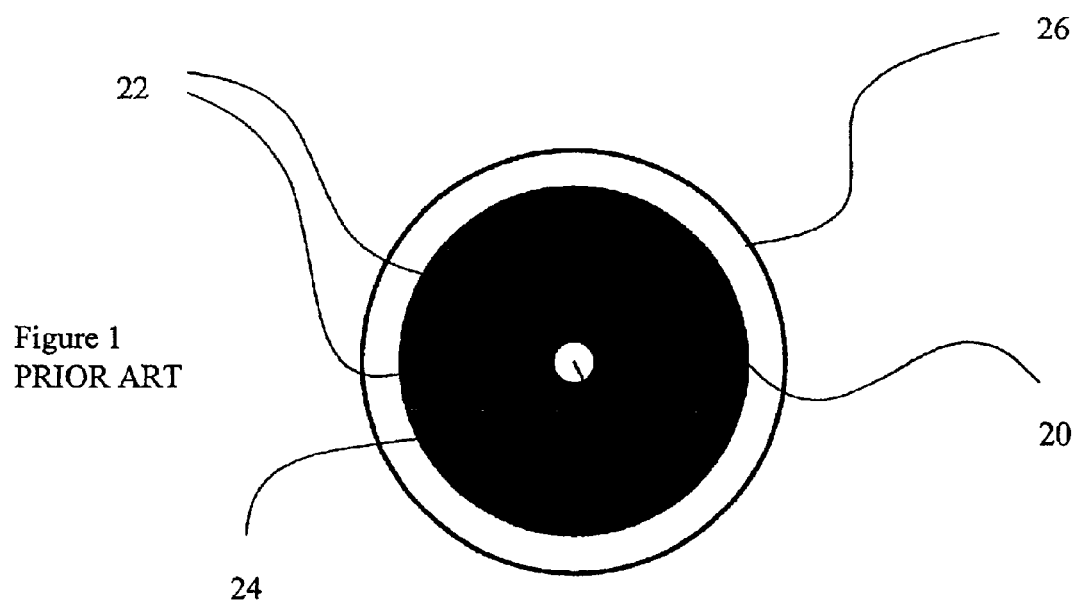
FIG. 1 is an end cross-sectional view of a known PCF.
Figure 2:
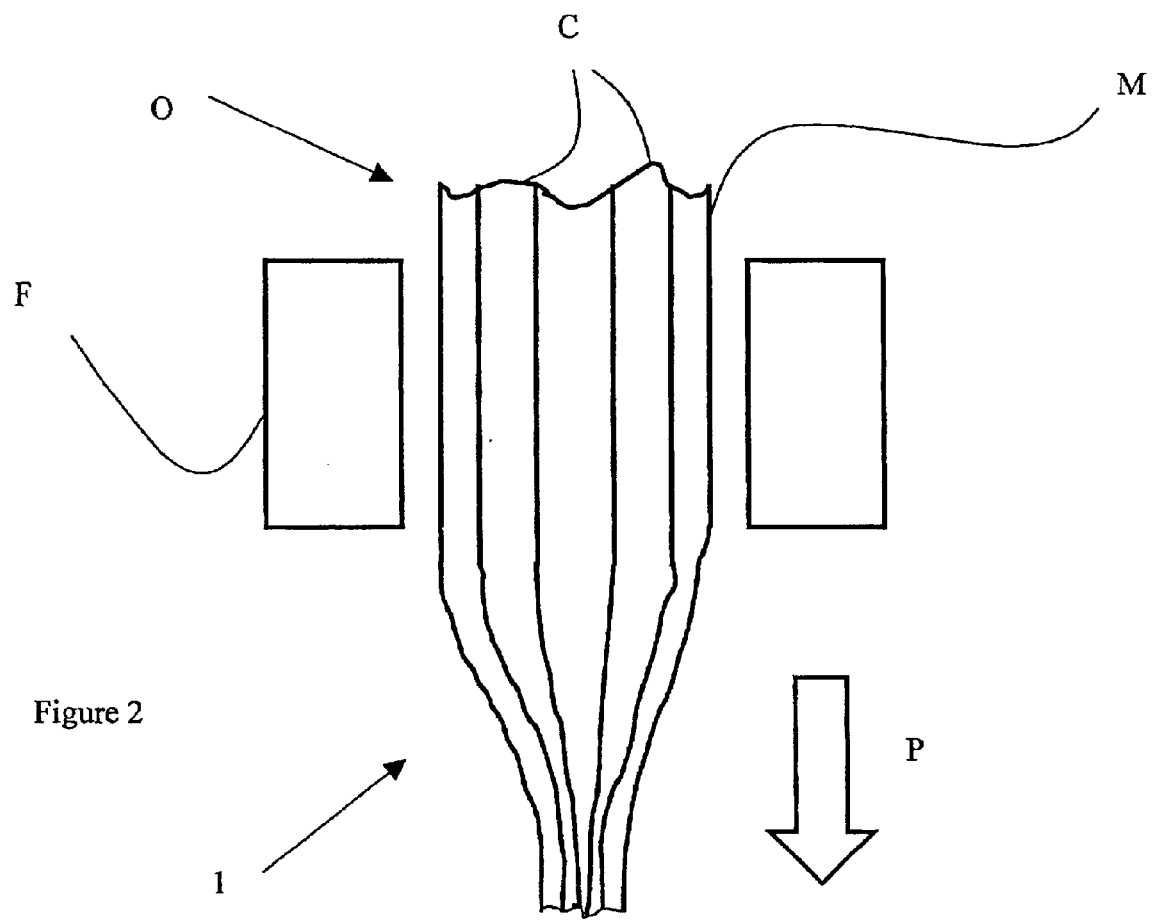
FIG. 2 is a schematic diagram of a multiple core optical fibre undergoing size reduction.

With reference to FIG. 2, a multiple core optical fibre preform O is provided by fusing together parallel strands of core material C and a cladding material M so as to embed the cores in the cladding. The preform O, with its multiple core preforms C, is then size reduced down to the required dimensions by heating it until plastic and pulling one end. The preform is heated in a furnace F and pulled in the direction shown by the arrow P.

A micro-structured optical fibre precursor is made by either pulling the multiple core optical fibre preform O so as to size reduce it on one operation, or in a separate operation, a multiple core optical fibre, having previously been fabricated, is heated and pulled so as to size reduce it. The precursor is encased in a jacket.

Figure 3:
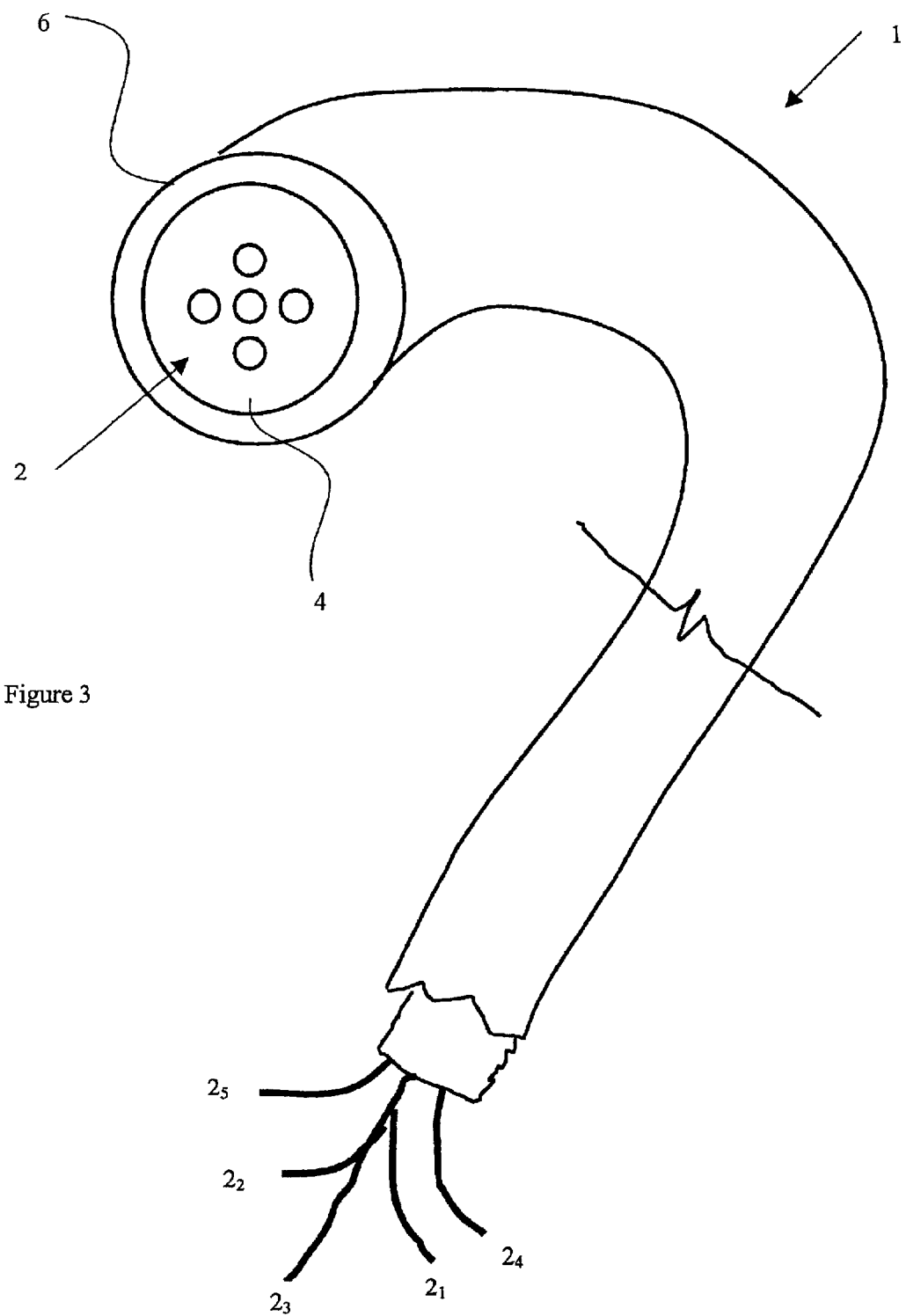
FIG. 3 is a schematic diagram of a multiple core optical fibre made by the method as shown in FIG. 1.

With further reference to FIG. 3, a micro-structured optical fibre precursor 1 has five solid multiple cores 2 (for the purpose of illustration only five cores 2 are shown) surrounded by a cladding 4 encased in a jacket 6. The precursor 1 is shown schematically as having had its jacket 6 and core 4 stripped back at one end to reveal the individual cores $2_1, 2_2, 2_3, 2_4$ and $2_5$. The precursor 1 is ten kilometers in length.

Figure 4:
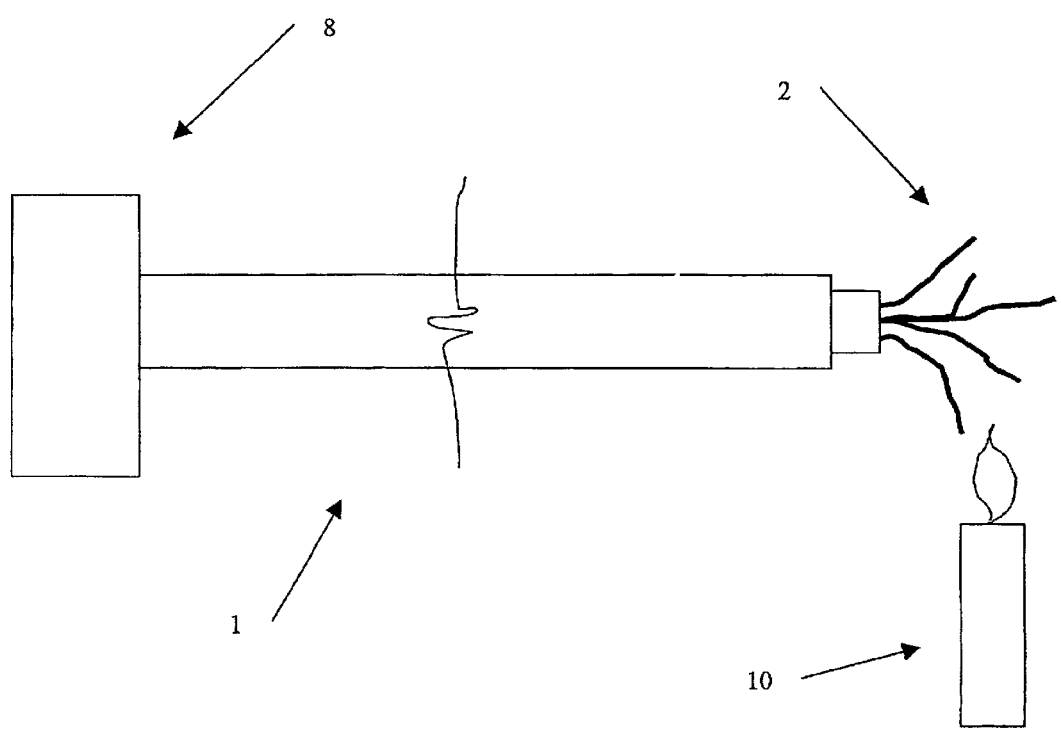
FIG. 4 is a schematic diagram of the fibre shown in FIG. 2 in which a fibre fuse is induced in a core.

With reference to FIG. 4, a transmitter 8 having a semiconductor laser device (not shown) launches light of wavelength 1056 nm, at a power of 4 W, into one end of the precursor 1. The light may be launched simultaneously into all of the cores 2 or into each, one at a time. A fibre fuse is induced in any of the cores carrying light by heating the exposed end, opposite the transmitter 8, using a heat source 10. Once induced, the fibre fuse propagates along the whole length of the core 2, consuming the core 2 as it proceeds. Thus, the effect of the fibre fuse is to create a continuous air channel along the whole length of the fibre 1. By inducing a fibre fuse in a number of the cores 2 a periodic lattice of air channels is created. If the centre core $2_3$ is left solid, the resulting lattice structure is that of a solid core PCF. On the other hand, if a fibre fuse is induced in the central core $2_3$, the resulting structure is that of a hollow core PCF.

The characteristics of the resulting structures are determined by the number, size and spacing of the air channels. Hence, the characteristics may be selected by choice of an appropriate multiple core optical fibre pre-cursor and by the degree of size reduction of the fibre pre-cursor or by the degree of size reduction of a multiple optical fibre preform.

According to an alternative embodiment, the power of the light launched into the fibre 1 and the heat applied to the cores 2 at the opposite end is such as to induce a fibre fuse in the core that propagates discontinuously along the whole length of the core and removes periodically spaced lengths of core material. Thus, the resulting air channel lattice structure may be three-dimensional.

What is claimed is:

1. A method of making a micro-structured optical fiber comprising the step of inducing a fiber fuse in at least one of the cores of a multiple core optical fiber precursor having multiple solid cores.

2. A method according to claim 1 wherein the effect of the fiber fuse is to consume the at least one core along the whole length of the fiber thereby creating a continuous channel in the fiber material.

3. A method according to claim 1 wherein the effect of the fiber fuse is to consume periodically spaced lengths of the at least one core along the whole length of the fiber thereby creating periodically discontinuous channels in the fiber material.

4. A method of making a micro-structured optical fiber comprising the steps of size reducing a multiple core optical fiber having solid multiple cores or size reducing a multiple core optical fiber preform having solid multiple core preforms, thereby to provide a size-reduced multiple core optical fiber, and inducing a fiber fuse in at least one of the cores of the size-reduced optical fiber.

5. A micro-structured optical fiber made by a method according to claim 1.

6. A micro-structured optical fiber made by a method according to claim 4.

7. A method of making a micro-structured optical fiber comprising the steps of providing a multi-mode optical fiber having at least one core and launching into the fiber a supported higher order mode thereby to induce fiber fusing in the at least one core.

8. An optical communications network comprising a micro-structured optical fiber made by a method according to claim 1.

9. An optical communications network comprising a micro-structured optical fiber made by a method according to claim 4.

10. An optical communications network comprising a micro-structured optical fiber made by a method according to claim 7.

* * * * *